United States Patent [19]
Lake

[11] Patent Number: 6,110,988
[45] Date of Patent: Aug. 29, 2000

[54] UV-CURABLE HARD COAT COMPOSITIONS AND PROCESSES

[75] Inventor: Randall Todd Lake, Newburgh, Ind.

[73] Assignee: Red Spot Paint & Varnish Co, Inc., Evansville, Ind.

[21] Appl. No.: 08/479,260

[22] Filed: Jun. 7, 1995

Related U.S. Application Data

[63] Continuation of application No. 08/223,124, Apr. 5, 1994, abandoned, which is a continuation of application No. 08/089,423, Jul. 7, 1993, abandoned, which is a continuation of application No. 07/679,608, Apr. 3, 1991, abandoned.

[51] Int. Cl.$^7$ .............................. C08F 2/50; C08L 75/16; C08K 5/05
[52] U.S. Cl. .................... 522/75; 522/78; 522/79; 522/80; 522/96; 522/175; 522/173
[58] Field of Search .................. 522/75, 96, 97, 522/174, 79, 78, 80, 90, 173, 175

[56] References Cited

U.S. PATENT DOCUMENTS

| | | | |
|---|---|---|---|
| 4,065,587 | 12/1977 | Ting .................................... | 427/54 |
| 4,128,600 | 12/1978 | Skinner et al. ...................... | 522/174 |
| 4,387,204 | 6/1983 | Zahir et al. ......................... | 522/181 |
| 4,393,187 | 7/1983 | Boba et al. ......................... | 522/174 |
| 4,463,169 | 7/1984 | Irving ................................. | 528/128 |
| 4,511,596 | 4/1985 | Berner ................................ | 522/107 |
| 4,608,409 | 8/1986 | Coady et al. ...................... | 524/199 |
| 5,514,522 | 5/1996 | Fitzgerald et al. ................. | 430/284.1 |
| 5,518,789 | 5/1996 | Burns et al. ....................... | 428/65.5 |

*Primary Examiner*—Susan W. Berman
*Attorney, Agent, or Firm*—Woodard, Emhardt, Naughton, Moriarty & McNett

[57] ABSTRACT

Described is a preferred UV curable coating composition comprising (exclusive of any solvent present): (a) about 5% to 90% by weight of an acrylated aliphatic urethane having a molecular weight of about 500 to 2000 and formed by the reaction of a multifunctional acrylate with a molecular weight of about 190 to 500 and containing at least three polymerizable unsaturated groups per molecule, with an aliphatic urethane based on a polymer of alkyl carbomonocycle diisocyanate with alkanepolyol polyacrylates; (b) about 5% to 30% by weight of a multifunctional acrylate having a molecular weight of about 170 to 1000 and containing at least two polymerizable unsaturated groups per molecule; and (c) a photopolymerization initiator and/or sensitizer. Also described are preferred processes and coated articles involving the preferred coating compositions.

21 Claims, No Drawings

UV-CURABLE HARD COAT COMPOSITIONS AND PROCESSES

This application is a continuation of application Ser. No. 08/223,124, filed Apr. 5, 1994, now abandoned, which is a continuation of application Ser. No. 08/089,423, filed Jul. 7, 1993, now abandoned, which is a continuation of application Ser. No. 07/679,608, filed Apr. 3, 1991, now abandoned.

BACKGROUND OF THE INVENTION

The present invention relates generally to ultraviolet (UV) cured coatings, and more particularly to UV curable coating compositions, processes of their use, and as well to coated articles resulting therefrom.

Conventionally cured hardcoat finishes have several disadvantages. In general, the coating materials and the curing agent must be applied separately, in a particular sequence and at particular relative levels. Because both the proportions of the ingredients and the timing of their application is critical, conventionally cured hardcoats have been difficult and costly to apply, especially with the consistency and uniformity required in current commercial applications.

UV cured coatings overcome several disadvantages associated with conventional hardcoat finishes. In particular, UV curable coating compositions may be premixed, e.g. the polymerization initiator is added to the active ingredients by the manufacturer when the coating is produced, and not by the coating user when the coating is about to be applied. Thus, mixing and measurement errors can be avoided and a more consistent product can be obtained.

Despite their many advantages, UV curable coating compositions themselves pose problems which must be addressed. For example, typical UV hardcoats are high molecular weight, highly crosslinked films which are formed from the highly reactive acrylate functionality. As such, known UV hardcoats have suffered from limited durability, low solids content and cured resin shrinkage. They have also required high doses of UV light to cure. Other UV hardcoats formulated in an attempt to overcome these problems typically suffer from some combination of loss of abrasion and scratch resistance, poor processibility and unsatisfactory durability. A need therefore exists for a UV curable product which is conveniently processable and which forms cured coatings exhibiting improved physical and chemical properties, e.g. scratch and abrasion resistance, and durability.

SUMMARY OF THE INVENTION

The applicant's invention now addresses these needs and provides in one preferred embodiment a scratch resistant UV curable coating composition. This composition comprises: (a) 5% to 90% by weight of an acrylated aliphatic urethane having a molecular weight of between about 500 and 2000 and formed by the reaction of (i) a multifunctional acrylate with a molecular weight of between about 190 and 500 and containing at least three polymerizable unsaturated groups per molecule, with (ii) an aliphatic urethane based on a polymer of alkyl carbomonocyclic diisocyanate with alkanepolyol polyacrylates; (b) 5% to 30% by weight of a multifunctional acrylate having a molecular weight of between about 170 and 1000 and containing at least two polymerizable unsaturated groups per molecule; and (c) a photopolymerization initiator and/or photopolymerization sensitizer. The composition can also optionally include a solvent. However, unless otherwise specified, percents by weight set forth in this application are calculated exclusive of any solvent present. More preferred compositions can also include suitable light stabilizing agents, e.g. hindered amine and/or benzotriazole derivatives, and also antioxidant materials.

Additional preferred embodiments of the invention relate to coated articles and coating processes resulting from and involving the use of applicant's preferred coating compositions.

One object of the invention is to provide improved ultraviolet curable coating compositions giving coatings and coated articles demonstrating superior chemical and physical properties such as chemical resistance, weather resistance, abrasion resistance, scratch resistance, stain resistance, heat resistance and adhesion.

Another object of the invention is to provide processes for coating articles, e.g. plastic articles, exhibiting improved physical and chemical properties.

Still another object of the present invention is to provide a coated article exhibiting superior physical and chemical properties.

Another object of this invention is to provide coating processes and compositions which enable convenient and consistent, uniform processibility.

Further objects and advantages of the present invention will be apparent from the following description and appended claims.

DESCRIPTION OF PREFERRED EMBODIMENTS

For the purposes of promoting an understanding of the principles of the invention, reference will now be made to certain embodiments and specific language will be used to describe the same. It will nevertheless be understood that no limitation of the scope of the invention is thereby intended, such alterations and further modifications and applications of the principles of the invention as described herein being contemplated as would normally occur to one skilled in the art to which the invention relates.

As indicated above, one preferred embodiment of this invention relates to a UV curable coating composition. In this regard, Formula I, set forth below, shows starting materials and compositional ranges for preferred coating compositions of the invention. The compositional ranges are given as percent by weight of the composition excluding any solvent which is included.

Formula I

| Formula I | |
|---|---|
| Acrylated aliphatic urethane | (5–90%) |
| Multifunctional acrylate | (5–30%) |
| Photopolymerization initiator/sensitizer | (3–15%) |
| Hindered amine light stabilizer | (0.1–7.5%) |
| Benzotriazole | (0.1–7.5%) |
| Antioxidant | (0.1–3.0) |
| Flow additive | (0.1–5.0%) |

The acrylated aliphatic urethanes according to the invention contain about 5% to about 95% by weight of prereacted multifunctional acrylate and the balance in the aliphatic urethane. More particularly, to obtain the acrylated aliphatic urethanes, a multifunctional acrylate having a molecular weight of about 190 to about 500 and containing at least 3 polymerizable unsaturated groups per molecule (e.g., pentaerythritol triacrylate, diphenyl erythritol tetraacrylate, and trimethylolpropane triacrylate) is prereacted with an aliphatic urethane based on a polymer of alkyl carbomonocyclic diisocyanate with alkanepolyol polyacrylates. The acrylate having at least three polymerizable groups provides an acrylated aliphatic urethane giving final coatings demonstrating good surface hardness, for example as evidenced by steel wool scratch resistance.

The preferred acrylated aliphatic urethane has a final molecular weight of about 500 to about 2000. More preferably, the acrylated aliphatic urethane has a molecular weight of about 800 to about 1000, with those having a molecular weight of about 800 being most preferred in work to date. These preferred acrylated aliphatic urethanes provide coatings of good weather and thermal crack resistance. Further, these acrylated aliphatic urethanes provide advantageous application solids, curing rates and material compatibility.

The acrylated aliphatic urethane may be obtained commercially. For example, EBECRYL 8301, (an acrylated aliphatic urethane prepared by reacting isophorone diisocyanate with pentaerythritol triacrylate) available from Radcure Specialties, Inc. of Atlanta, Ga. has been highly preferred in work to date.

Exclusive of any solvent present, as indicated above, the acrylated aliphatic urethane constitutes about 5% to 90% by weight of the coating composition. More preferably, this acrylated aliphatic urethane makes up about 50% to about 90% of the composition, most preferably about 80%. These preferred levels have provided good weather and thermal crack resistance, as well as advantageous viscosity, material capacity and cure rates.

As will be understood, the particular multifunctional acrylate employed will depend upon the desired application viscosity and other properties. The preferred multifunctional acrylates are of the reactive diluent type, have a molecular weight of about 170 to about 1000, and contain at least two polymerizable unsaturated groups per molecule. Representative multifunctional acrylates thus include ethylene glycol di(meth)acrylate, 1,6-hexanediol diacrylate, pentaerythritol triacrylate, pentaerythritol tetra acrylate, trimethylolpropane triacrylate, tetraethyleneglycol diacrylate, and the like, and mixtures thereof, with light-stable materials, e.g. 1,6-hexanediol diacrylate, being more preferred.

The preferred coating composition includes the multifunctional acrylate in an amount of about 5% to about 30% by weight, with the range of about 10% to about 20% being more preferred. These preferred levels provide compositions of good compatibility which give coatings of excellent thermal crack resistance.

As those practiced in these areas will appreciate, many photopolymerization initiators will be suitable for the invention. These include, for instance, benzophenone, benzion, benzionmethyl ether, benzion-n-butyl ether, benzion-iso-butyl ether, propiophenone, acetophenone, methyphenylgloxylate, 1-hydroxycyclohexyl phenyl ketone, 2,2-diethoxyacetophenone, ethlphenylpyloxylate, phenanthraquinone, and the like, and mixtures thereof. In work thus far, 1-hydroxycyclohexyl phenyl ketone has been more preferred.

The photopolymerization initiator and/or sensitizer will be included in an amount sufficient to obtain the desired cure response. In preferred compositions of the invention, the photopolymerization initiator or sensitizer is included in amounts of about 3% to about 15% by weight. The range of about 5% to about 8.5% is more preferred, with about 6% being most preferred so far. As indicated, however, the amount of initiator and/or sensitizer included will vary based upon many factors such as the cure rate and level of scratch resistance desired. For additional information as to photopolymerization initiators and sensitizers, reference can be made to C. G. Roffey, *Photopolymerization of Surface Coatings,* Chapter 3: "Photo-initiators and photo-sensitizers", John Wiley & Sons Ltd (1982), which is hereby incorporated by reference.

The coating composition also preferably includes other materials such as light stabilizers, e.g. suitable hindered amines and/or benzotriazole derivatives, as well as antioxidants. These materials will be included in varying amounts in accordance with the particular use or application desired. When included, their amounts will be sufficient to provide increased weatherability yet still obtain adequate cure response for the composition. In more preferred compositions, hindered amine, benzotriazole, and antioxidant have been included in amounts of about 1–6%, 0.5–2.5%, and 0.25–1.5%, respectfully, and in particularly preferred compositions about 0.7%, 0.5% and 0.5% by weight, respectively.

As stated, the coating composition also optionally includes a suitable inert solvent. Representative such solvents include ester solvents, e.g. ethyl acetate, butyl acetate, and the like, ketone solvents, e.g. acetone, methylisobutylketone, methylethylketone, and the like, alcohols, e.g. butyl alcohol, and the like, and aromatic solvents, e.g. toluene, xylene, and the like. The amount of solvent included will vary in accordance with the particular application at hand. For instance, for spray applications, higher levels of solvent will typically be included, while for roll applications, lower levels of inert solvent, if any, will be employed. In any event, the inert solvent will constitute from 0% to about 95% by weight of the coating composition, and in more preferred coating compositions about 40% to 60%.

As will be understood, the coating composition can also include other conventional additives. For instance, it can contain polymeric or silicone coating surface improvers, flow improvers, dyes, pigments, flatting agents (e.g. wax-coated or non-wax-coated silica or other inorganic materials), etc. In more preferred compositions, flow improver is included at a level of about 0.3–2%, and in one especially preferred composition, the flow improver BYK 301, available from BYK-CHEMIE, of Wallingford, Conn., has been included.

As to its use, the coating composition can be applied by any conventional coating method as known in the art. For example the composition can be applied directly to the substrate or over another previously-cured (e.g. paints or primers) or uncured (e.g. in the case of tie coats) coating. The topcoat material is advantageously used at about 0.3 mils to about 3.0 mils of cured film thickness, with more preferred cured film thicknesses being those around about 1 mil.

Once applied, the coating composition can be cured by irradiation with ultraviolet rays as is known to those skilled in the art. In this regard, the irradiation is continued until curing is complete, with preferred exposure times typically being less than 300 seconds. Curing temperatures can range from room temperature to the heat distortion temperature of the substrate, while curing distances are typically between about 2 and 18 inches from the UV source.

An ultraviolet light source having a wavelength range of between about 1800 Angstroms and 4500 Angstroms is preferred for curing the topcoat. For example, sunlight, mercury lamps, arc lamps, zenon lamps, gallium lamps, and the like may be used, but high pressure or ultrahigh pressure mercury lamps with power outputs of between about 30 W/cm and 400 W/cm provide particularly advantageous rapid cures.

A high pressure mercury lamp having an intensity of about 30 W/cm to 400 W/cm is preferred, for a total exposure of between about 300 and 16000 mJ/cm$^2$ as measured by a compact radiometer at 60 to 1200 mW/cm$^2$ and about 75 to 4000 mJ as measured by a UVIMAP, with a preferred exposure of about 3000 mJ/cm$^2$ as measured by a compact radiometer at 260 mW/cm$^2$ and about 700 mJ as measured by a UVIMAP. These preferred curing processes have provided good through cure, and have ensured advantageous coatings which resist premature yellowing and demonstrate desirable thermal crack resistance. Moreover, these advantageous cures have been achieved over a surprisingly wide range of exposures. Accordingly, the preferred compositions are readily and highly conveniently processable. Previously known UV curable compositions have demonstrated serious deficiencies in this regard, a problem long recognized in the industry leading to increased production costs and wastes of time and materials.

For the purposes of promoting a further understanding of the invention and its preferred features and advantages, reference will now be made to the following specific examples and tables. It will be understood that these examples and tables are given by way of illustration and are not restrictive of the invention.

Unless otherwise indicated specifically or in context, all molecular weights given herein are given as number average molecular weight.

EXAMPLE 1

Preparation of Preferred UV Curable Coating Composition

In order to prepare a UV curable coating composition in accordance with the invention, items 1 and 2 of Formula II below were charged into a clean stainless steel vessel equipped with a stirrer. Thereafter, ingredients 3 through 9 were added under agitation until a clear homogeneous mixture was obtained. This composition was designated "Topcoat A".

Formula II

| | Formula II | |
|---|---|---|
| | | Part by weight |
| 1. | Isopropanol | 588.1 |
| 2. | Butanol | 17.8 |
| 3. | 1-Hydroxycyclohexyl phenyl ketone | 23.7 |
| 4. | Hindered amine light stabilizer | 5.9 |
| 5. | Benzotriazole | 2.4 |
| 6. | Antioxidant | 2.4 |
| 7. | Acrylated aliphatic urethane* | 320.5 |
| 8. | 1,6 Hexanediol diacrylate | 43.2 |
| 9. | "Byk 301" flow improver | 3.6 |

*"EBECRYL 8301", based on polymer of alkyl carbomonocyclic diisocyanate with alkanepolyol polyacrylate mixed with an acrylated polyol.

EXAMPLE 2

Production of Topcoated Plastic Molded Article

The above-described Topcoat A was applied to polycarbonate resin lenses by spray to allow 23 microns of cured coating thickness. Thereafter, the material was irradiated with a high pressure mercury lamp of 120 W/cm$^2$, with the substrate positioned eight inches from the light source for an exposure of 3000 mJ/cm$^2$ in air.

The thus obtained topcoated polycarbonate resin lens had a clear appearance. The product was evaluated by exterior decorative standards, and superior results were obtained as set forth in Table 1.

TABLE 1

| Evaluated Item | Evaluated Method | Results |
|---|---|---|
| Scratch Resistance | 0000 Steel Wool Rubs | Passable |
| Adhesion | Peel Test ASTM | No loss |
| Abrasion Resistance | Taber Abrader, CS-10, 500 g load, 300 cycles | Passable |
| Water Resistance | 32 degrees Centigrade, 240 hour immersion | Passable, 2ndary adhesion OK |
| Thermal Shock Resist. | 4 hrs. water immersion 4 hrs. −29° C. Steam blast on scribe | Passable |
| Heat Resistance | 120° C., 2 hrs. | No cracks |
| Resistance to Water & Soap Spotting | Discoloration | Passable |
| Resist. to Acid Spots | No dulling/color change | Passable |
| Chemical Resistance | Motor Oil, Tar remover Windshield Wiper Fluid Antifreeze, Motol Fuel | Passable |
| Weather Resistance | EMMA (QUE) 925 kJ, 3.5 years equivalence | Passable |

EXAMPLE 3

Comparative Coating Material

A comparative topcoat was prepared in the same manner as in Topcoat A in Example 1, except the acrylated aliphatic urethane was replaced with one of a molecular weight of 2279. The resulting material was designated "Topcoat B".

EXAMPLE 4

Comparative Coated Article

Topcoat B was applied and cured as was Topcoat A in Example 2. The resultant coated article was evaluated by the same conditions as in Example 2, and the results set forth in Table 2 were obtained:

TABLE 2

| Evaluated Item | Results of Evaluation |
|---|---|
| Scratch Resistance | Noticeable Scratches |
| Adhesion | No loss |
| Abrasion Resistance | Unacceptable |
| Water Resistance | Passable Secondary adhesion OK |
| Thermal Shock Resistance | Passable |
| Heat Resistance | Unacceptable |
| Resistance to Water & Soap Spotting | Passable |
| Resistance to Acid Spotting | Passable |
| Chemical Resistance | Passable |
| Weather Resistance | Passable |

It was thus demonstrated that coating compositions including acrylated aliphatic urethanes with molecular weights above about 2000 provide less desirable coatings.

What is claimed is:

1. An ultraviolet curable coating composition for forming a scratch-resistant, exterior-durable coating, comprising:

an inert solvent;

about 5% to about 90% by weight relative to the weight of the overall coating composition exclusive of the inert solvent present, of an acrylated aliphatic urethane, said acrylated aliphatic urethane having a number average molecular weight of between about 500 and 2000 and formed by the reaction of a first multifunctional acrylate with a molecular weight of about 190 to about 500 and containing at least three polymerizable acrylate groups per molecule with an aliphatic urethane comprised of a polymer of alkyl carbomonocyclic diisocyanate with alkanepolyol polyacrylate;

about 5% to about 30% by weight, relative to the weight of the overall coating composition exclusive of the inert solvent present, of one or more multifunctional acrylates having a molecular weight of about 170 to 1000 and containing at least two polymerizable acrylate groups per molecule;

a photopolymerization initiator or sensitizer; and a light stabilizer;

the complete curing of said ultraviolet curable coating composition being achievable by the application of ultraviolet radiation to form a scratch-resistant, exterior durable coating.

2. A coating composition according to claim 1 wherein said light stabilizer comprises a hindered amine light stabilizer.

3. A coating composition according to claim 2 wherein said light stabilizer also comprises a benzotriazole light stabilizer.

4. A coating composition according to claim 3 and further comprising an antioxidant.

5. A coating composition according to claim 4, which, exclusive of said solvent, is comprised about 50% to about 90% by weight of said acrylated aliphatic urethane.

6. A coating composition according to claim 5 which, exclusive of said solvent, is comprised about 10% to about 20% of said one or more multifunctional acrylates.

7. A coating composition according to claim 6, which, exclusive of said solvent, is comprised about 3% to about 15% of said photopolymerization initiator or sensitizer.

8. A coating composition according to claim 7, wherein said acrylated aliphatic urethane has a number average molecular weight of about 800 to about 1000.

9. A coating composition according to claim 8, wherein said light stabilizer includes a hindered amine and a benzotriazole light stabilizer.

10. A coating composition according to claim 9, and also including an antioxidant.

11. A coating composition according to claim 5, wherein said one or more multifunctional acrylates having a molecular weight of about 170 to 1000 comprises one or more members of the group consisting of ethylene glycol diacrylate, ethylene glycol dimethacrylate, 1,6-hexanediol diacrylate, pentaerythritol triacrylate, pentaerythritol tetra acrylate, trimethylolpropane triacrylate, and tetraethyleneglycol diacrylate.

12. A coating composition according to claim 11, wherein said one or more multifunctional acrylates having a molecular weight of about 170 to 1000 comprises 1,6-hexanediol diacrylate.

13. A coating composition according to claim 11, wherein said one or more multifunctional acrylates having a molecular weight of about 170 to 1000 constitutes 10% to 20% by weight of the overall coating composition exculsive of the inert solvent present.

14. A coating composition according to claim 11, wherein said inert solvent comprises an alcohol.

15. A coating composition according to claim 14, wherein said inert solvent comprises isopropanol or butanol.

16. An ultraviolet curable coating composition, comprising:

(a) an inert solvent;

(b) an acrylated aliphatic urethane having a number average molecular weight of about 500 to about 2000 and formed by the reaction of a first multifunctional acrylate with a molecular weight of about 190 to about 500 and containing at least three polymerizable acrylate groups per molecule with an aliphatic urethane comprised of a polymer of alkyl carbomonocyclic diisocyanate with alkanepolyol polyacrylate;

(c) one or more multifunctional acrylates having a molecular weight of about 170 to about 1000 and containing at least two acrylate groups per molecule;

(d) a photopolymerization initiator or sensitizer, and (e) a light stabilizer;

the complete curing of said ultraviolet curable coating composition being achievable by the application of ultraviolet radiation; and said ultraviolet curable coating composition further being characterized by the ability to form ultraviolet-cured coatings of a thickness of about 1 mil which pass in exterior decorative standards testing for abrasion resistance (Taber Abrader, CS-10, 500 g load, 300 cycles); water resistance (240 hour immersion in water at 32 deg. C.); heat resistance (2 hours at 120 deg. C.); and weather resistance (EMMA (QUE), 925 kJ, 3.5 years equivalence).

17. A coating composition according to claim 16, wherein said one or more multifunctional acrylates comprises one or more members of the group consisting of ethylene glycol dimethacrylate, 1,6-hexanediol diacrylate, pentaerythritol triacrylate, pentaerythritol tetra acrylate, trimethylolpropane triacrylate, and tetraethyleneglycol diacrylate.

18. A coating composition according to claim 17, wherein said one or more multifunctional acrylates comprises 1,6-hexanediol diacrylate.

19. A coating composition according to claim 16, wherein said acrylated aliphatic urethane has a number average molecular weight of about 1200 to about 2000, and said first multifunctional acrylate is pentaerythritol triacrylate.

20. A coating composition according to claim 19, wherein said one or more multifunctional acrylates comprises one or more members of the group consisting of ethylene glycol dimethacrylate, 1,6-hexanediol diacrylate, pentaerythritol triacrylate, pentaerythritol tetra acrylate, trimethylolpropane triacrylate, and tetraethyleneglycol diacrylate.

21. An ultraviolet curable coating composition for forming a scratch-resistant, exterior-durable coating, comprising:

an inert solvent;

about 5% to about 90% by weight relative to the weight of the overall coating composition exclusive of the inert solvent present, of an acrylated aliphatic urethane having a number average molecular weight of between about 500 and 2000 and formed by the reaction of pentaerythritol triacrylate with isophorine diisocyanate;

about 5% to about 30% by weight, relative to the weight of the overall coating composition exclusive of the inert solvent present, of one or more multifunctional acrylates having a molecular weight of about 170 to 1000 and containing at least two polymerizable acrylate groups per molecule;

a photopolymerization initiator or sensitizer; and a light stabilizer;

the complete curing of said ultraviolet curable coating composition being achievable by the application of ultraviolet radiation to form a scratch-resistant, exterior durable coating.

* * * * *